US009664172B2

(12) United States Patent
Wieser

(10) Patent No.: US 9,664,172 B2
(45) Date of Patent: May 30, 2017

(54) WIND TURBINE

(71) Applicant: Gudrun Wieser, Schiedlberg (AT)

(72) Inventor: Gerhard Wieser, Schiedlberg (AT)

(73) Assignee: Gudrun Wieser, Schiedlberg (AT)

( * ) Notice: Subject to any disclaimer, the term of this patent is extended or adjusted under 35 U.S.C. 154(b) by 361 days.

(21) Appl. No.: 14/358,803

(22) PCT Filed: Nov. 16, 2012

(86) PCT No.: PCT/AT2012/050179
§ 371 (c)(1),
(2) Date: May 16, 2014

(87) PCT Pub. No.: WO2013/071328
PCT Pub. Date: May 23, 2013

(65) Prior Publication Data
US 2014/0321975 A1    Oct. 30, 2014

(30) Foreign Application Priority Data

Nov. 17, 2011  (AT) .................. A 1709/2011

(51) Int. Cl.
| F03D 7/02 | (2006.01) |
| F03D 1/02 | (2006.01) |
| F03D 1/04 | (2006.01) |
| F03D 1/06 | (2006.01) |
| F03D 7/04 | (2006.01) |

(52) U.S. Cl.
CPC .............. *F03D 1/025* (2013.01); *F03D 1/04* (2013.01); *F03D 1/0608* (2013.01);
(Continued)

(58) Field of Classification Search
CPC .......... F03D 1/025; F03D 1/04; F03D 1/0608; F03D 9/007; F03D 7/0244; F03D 7/04;
(Continued)

(56) References Cited

U.S. PATENT DOCUMENTS 7,431,567 B1 * 10/2008 Bevington .............. C08F 10/00
                                                                415/201
2004/0258527 A1 * 12/2004 Kaneko ................ F04D 29/282
                                                                416/182

(Continued)

FOREIGN PATENT DOCUMENTS

| DE | 804 090 C | 4/1951 |
| DE | 29 49 447 B1 | 10/1980 |

(Continued)

OTHER PUBLICATIONS

International Search Report of PCT/AT2012/050179, mailed Mar. 19, 2013.
International Preliminary Report on Patentability and the Written Opinion of the International Searching Authority of PCT/AT2012/050179.

*Primary Examiner* — Phutthiwat Wongwian
*Assistant Examiner* — Kelsey Stanek
(74) *Attorney, Agent, or Firm* — Collard & Roe, P.C.

(57) ABSTRACT

The invention relates to a wind power station (1) for energy generation with an axial-flow, rotating, vortex-generating wind concentrator (2) pivot-mounted on a shaft (3), covered by a ring-shaped outer jacket (4) which on its outside features flow channels distributed over 360° and which is equipped concentrator blades (7) in a circular arrangement between the shaft (3) and the ring-shaped outer jacket (4). To create favorable conditions, it is proposed to include sawtooth-shaped, curved edge-vortex-generating guide profiles (5) producing a downstream vortex coil across the entire cross-section of the ring-shaped outer jacket (4).

14 Claims, 6 Drawing Sheets

(52) U.S. Cl.
CPC .............. *F03D 7/0244* (2013.01); *F03D 7/04* (2013.01); *F05B 2240/33* (2013.01); *Y02E 10/721* (2013.01)

(58) Field of Classification Search
CPC .......... F05B 2240/122; F05B 2240/133; F05B 2240/13; Y02E 10/721; Y02E 10/726; Y02E 10/72
USPC .... 290/55; 415/4.3, 121.3, 182.1, 68, 208.2, 415/123, 169.2
See application file for complete search history.

(56) References Cited

U.S. PATENT DOCUMENTS

| | | | |
|---|---|---|---|
| 2010/0316487 A1* | 12/2010 | Presz, Jr. .................. | F03D 1/04 415/121.3 |
| 2011/0037268 A1* | 2/2011 | Sammy .................. | F03D 1/025 290/55 |
| 2011/0103955 A1 | 5/2011 | Desaulniers | |
| 2012/0049523 A1* | 3/2012 | Bersiek .................. | F03D 1/025 290/44 |

FOREIGN PATENT DOCUMENTS

| | | | | |
|---|---|---|---|---|
| DE | 2949447 B1 * | 10/1980 | ............ | A01G 13/06 |
| EP | 1415089 B1 | 3/2007 | | |
| GB | WO 2010131052 A2 * | 11/2010 | .............. | F03D 1/04 |
| WO | 02/057625 A1 | 7/2002 | | |
| WO | 2010/108196 A1 | 9/2010 | | |
| WO | 2010/131052 A2 | 11/2010 | | |

\* cited by examiner

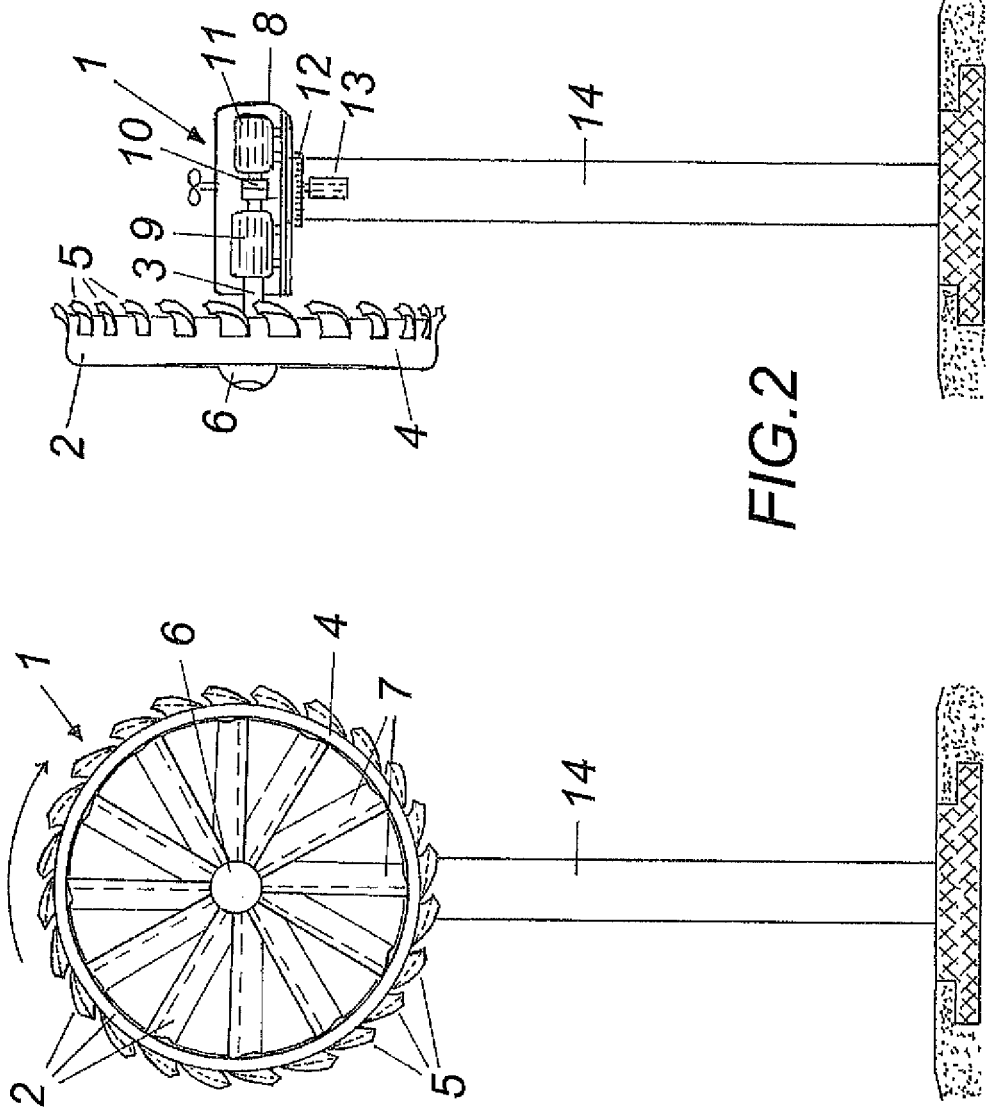

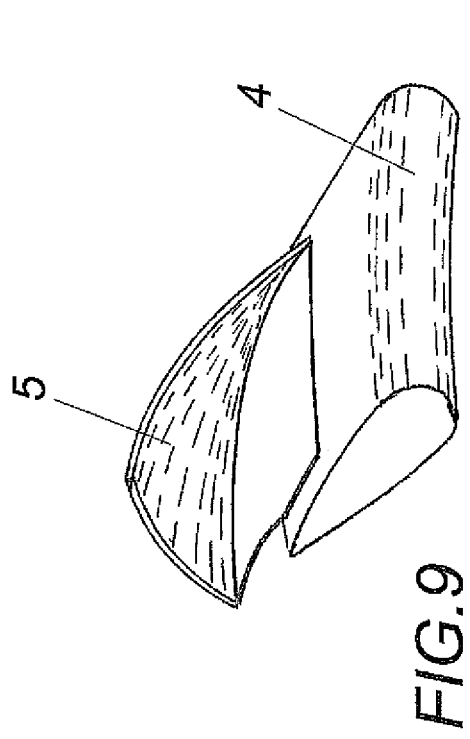
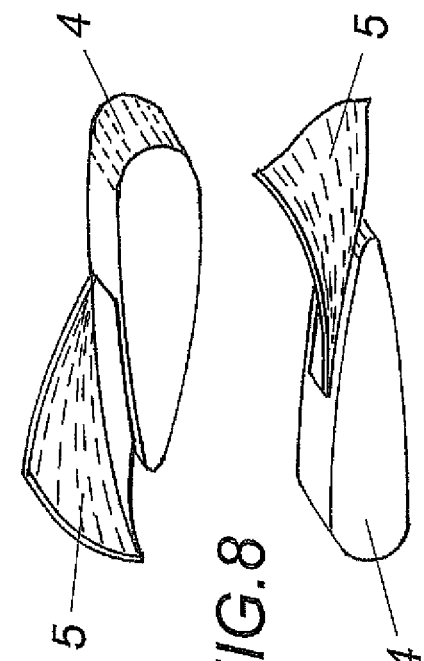
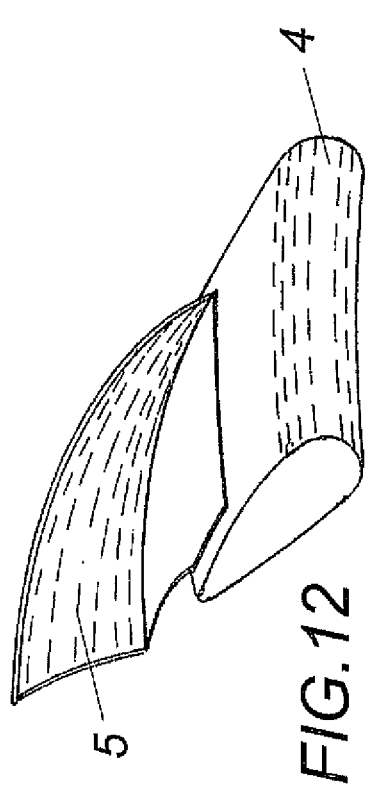
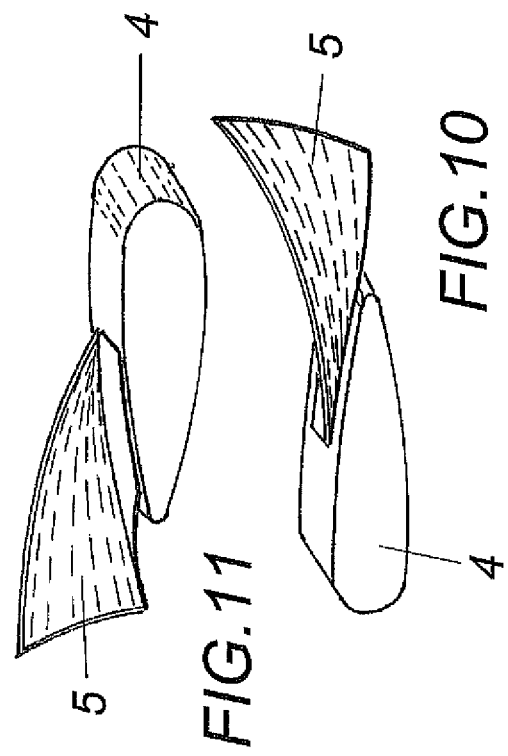

WIND TURBINE

CROSS REFERENCE TO RELATED APPLICATIONS

This application is the National Stage of PCT/AT2012/050179 filed on Nov. 16, 2012, which claims priority under 35 U.S.C. §119 of Austrian Application No. A 1709/2011 filed on Nov. 17, 2011, the disclosure of which is incorporated by reference. The international application under PCT article 21(2) was not published in English.

FIELD OF THE INVENTION

The invention relates to a wind power station for energy generation with an axial-flow, rotating, vortex-generating wind concentrator with a ring-shaped outer jacket which on the outside features flow channels distributed over 360° and which is equipped with concentrator blades in a circular arrangement between the shaft and the ring-shaped outer jacket (WO 02/057625 A1).

STATE OF TECHNOLOGY

The above appliance is equipped with a vortex generator on its outer jacket, but also features a very sophisticated, turbine-type design, Otherwise, various systems are suitable for utilizing the kinetic energy of air.

The known wind power stations mostly have propeller-shaped rotors which are aligned in an upwind or downwind direction for using the uplift force. However, based on Betz's law, propeller-shaped wind power stations provide the disadvantage that their effectiveness is quite low, in particular in the case of low wind speeds and smaller diameters. Furthermore, it is generally known that propeller-shaped wind power stations produce very high noise levels exceeding those permitted for smaller in-house systems in residential areas. Propeller-shaped rotors also require adequate hub heights as—with increasing rotor blade size—the usable energy density and energy content of the airstream vary considerably over the total sweeping cross-section.

A known procedure (EP 1415089) for improving this situation is to feed the airstream through an axial-flow rotor to produce higher energy density with increased energy content and convert the kinetic energy of natural air to electric energy.

The axial-flow rotor on a pivot-mounted shaft with blades includes flow channels for the axial acceleration of air. As a result of its axial airstream, this known wind power station is able to more efficiently use the available air in a location and thereby improve the utilization of the kinetic energy of this airstream within the permitted range of Betz's law by using accelerating flow channels and then converting it to electrical energy.

It is also known that airstream speed is decelerated in proportion to the roughness of the ground. Another fact is the specific wind shear of a location, i.e. that air speed decreases the closer it gets to the ground. With decreasing height, these circumstances result in gusty to turbulent winds that negatively affect the roughness length and significantly reduce the energy content of the airstream. More details on these conditions are provided in the handbook "Guidelines for Design of Wind Turbines" by Risoe National Laboratory.

DESCRIPTION OF THE INVENTION

The invention is therefore based on the task of remedying these deficiencies to provide a simple, efficient wind power station which uses the above-described available wind energy with an improved degree of efficiency and especially feeds the airstream into the rotating, vortex-generating wind concentrator with superior roughness lengths and increased energy content for all usable air speeds.

The invention solves this challenge by introducing sawtooth-shaped, curved guide profiles generating edge vortices producing a down-stream vortex coil across the entire cross-section of the ring-shaped outer jacket. Especially the sawtooth-shaped, curved flow channels distributed over 360 degrees on the outer jacket which turn into the direction of the flow create edge vortices behind the wind concentrator which are separated on the guide profiles.

The edge vortices go with the flow and, through mutual induction, start a rotating downstream motion creating a vortex coil with a concentrator eye creating a strong vacuum across the entire cross-section of the ring-shaped outer jacket.

This produces an increased flow rate on the inside of the vortex coil with a drop in the local pressure behind the wind concentrator, thereby increasing the performance of the rotating wind concentrator as a result of the increased pressure drop.

We know from flow mechanics that vacuum also propagates to adjacent areas, increasing the airstream in the described wind concentrator via the concentrator blades; this results in a higher energy performance due to the forced higher mass flow rate.

In addition to the vortex coil formation, the coil-forming wind concentrator which is the subject matter of this invention, with its sawtooth-shaped inward-turning curved guide profiles distributed over 360 degrees in a circular shape on the ring-shaped outer jacket, also provides the benefit of increasing the downstream flow rate and torque on the shaft of the wind power station, forming a concentrator eye with a strong vacuum behind the wind concentrator across the entire cross-section of the ring-shaped outer jacket for all air speeds. This improves the roughness lengths and, among others, balances wind power-related short-term fluctuations in the drive speed between gusts of wind. To this end, the guide profiles may be curved in a longitudinal profile direction and, if necessary, around a longitudinal axis of the profile.

This enhances the energy yield per square meter of sweeping area as a result of the increasing effect of uplifting forces on the rotating, vortex-generating wind concentrator which also increasingly affect the torque and, hence, the actual performance per square meter of sweeping area. This results in a faster start-up of the wind power station with lower wind speeds and subsequently has a beneficial effect on the performance curve for all usable wind speeds.

In addition or as an alternative, the outer jacket may be equipped with guide profiles with wing-tip shaped winglets with particularly beneficial, calculable vortex shedding.

To improve flow characteristics, propulsion and vortex shedding, in particular for low wind speeds, the outer jackets, guide profiles and, if necessary, the winglets may feature a wing section.

The vortex-generating, inward-turning curved guide profiles in a counter-rotational direction can also be used for fixed jackets of turbines and rotors.

Another configuration for the wind concentrator which is the subject matter of this invention is as a motor-operated propulsion-generating fan concentrator. In this configuration a vacuum zone is formed in an upstream direction which, in a downstream direction, also propagates into adjacent remote local areas of the wind concentrator as a result of the suction effect, thereby reducing the energy consumption of the motor drive by reducing the local pressure as compared to traditionally designed fans to the state-of-the-art.

To further increase the degree of efficiency of the wind power station which is the subject-matter of this invention, it is suggested to add an axial-flow auxiliary concentrator downstream to the rotating wind concentrator which is mounted on an additional shaft with both concentrators being covered by a horizontal uninterrupted ring- or diffuser-shaped fixed jacket.

If an additional increase of the wind speed in the horizontal, ring- or diffuser-shaped fixed jacket is requested, it is advantageous to use a nozzle-shaped tapered design on the wind entry side which widens on the exit side to a laval-nozzle shape.

In order to be able to operate the wind concentrator or the auxiliary concentrator as a control device for the respective other wind concentrator, the wind concentrator and/or auxiliary concentrator is assigned a brake system by which either one of the wind concentrators can be decelerated to standstill.

The wind power station with a rotating, vortex-generating wind concentrator which is the subject-matter of this invention is equipped with a horizontal rotation axis in an upwind or downwind direction fitted on a mast with a slewing ring or similar. In the same way, the in-line wind concentrator and the downwind auxiliary concentrator with a horizontal fixed ring-, diffuser- or laval-nozzle-shaped jacket are designed to be fixed on a mast with slewing rings or similar.

If a solar use of the wind power station which is the subject-matter of this invention is requested, the vertical vortex-generating wind concentrator is fitted with flexible thin-layered solar panels for solar energy use. The coating with flexible solar panels covers the wind concentrator, the vortex-generating guide profiles which are arranged in a circular direction as well as the horizontal, fixed ring-, diffuser- or laval-nozzle-shaped outer jackets or parts thereof.

The heat energy produced by the solar panels is dissipated and converted to electrical energy. By dissipating the heat energy, the solar panels contribute to cooling down the wind concentrator surfaces which in addition cools the airstream in the flow channels, thereby increasing the specific weight of the air and, hence, energy efficiency. It is also generally known that solar panels delay ice formation or snow deposits.

Another suggested use of the wind power station which is the subject-matter of this invention is the withdrawal of water from the humidity in the incoming axial, coil-shaped air flowing to the horizontal, fixed laval-nozzle-shaped outer jacket which is initially tapered in the incoming air direction and later widens towards the air exit side.

The spiral-shaped entry of air into the horizontal laval-nozzle-shaped outer jacket cools down the air between the two wind concentrators resulting in the separation of water at the bottom of the jacket. The water withdrawn from the air is intended for collection and efficient irrigation and other technical areas of use. The water can either be collected underground or by pumping it into above-ground collection basins.

If the further cooling down of the airstream in the horizontal laval-nozzle-shaped outer jacket is requested to remove more water from the humidity of the air, it is suggested to cool down the wind concentrator on the air entry side as well as the laval-nozzle-shaped outer jacket as required by fitting cooling wires and/or cooling loops or similar. Such cooling wires and/or cooling loops may also arranged parallel, in a grid shape, between the two wind concentrators.

To be able to use the mechanism for eliminating water from the air stream also in times of no or very little wind, one of the in-line wind concentrators in the horizontal laval-nozzle-shaped outer jacket is motor-operated via the generator to function as a propulsion-generating fan. There is an option to either use the wind concentrator or the auxiliary wind concentrator as a motor-operated fan; thereby, an upstream suction is created with a propulsion-generating effect.

BRIEF DESCRIPTION OF THE DRAWINGS

The technical drawings provide a schematic representation of the invention. The figures show the following:

FIG. 1 is a front view of the wind power station which is the subject matter of this invention with the rotating, vortex-generating wind concentrator in an upwind configuration.

FIG. 2 is a side view of the wind power station which is the subject matter of this invention with rotating vortex-generating wind concentrator in a downwind configuration.

FIGS. 7 to 12 provide more configuration options of the curved, inward turning sawtooth guide profiles arranged in a circle over 360 degrees in a counter-rotational direction from different views.

MODES FOR CARRYING OUT THE INVENTION

Figure 3:
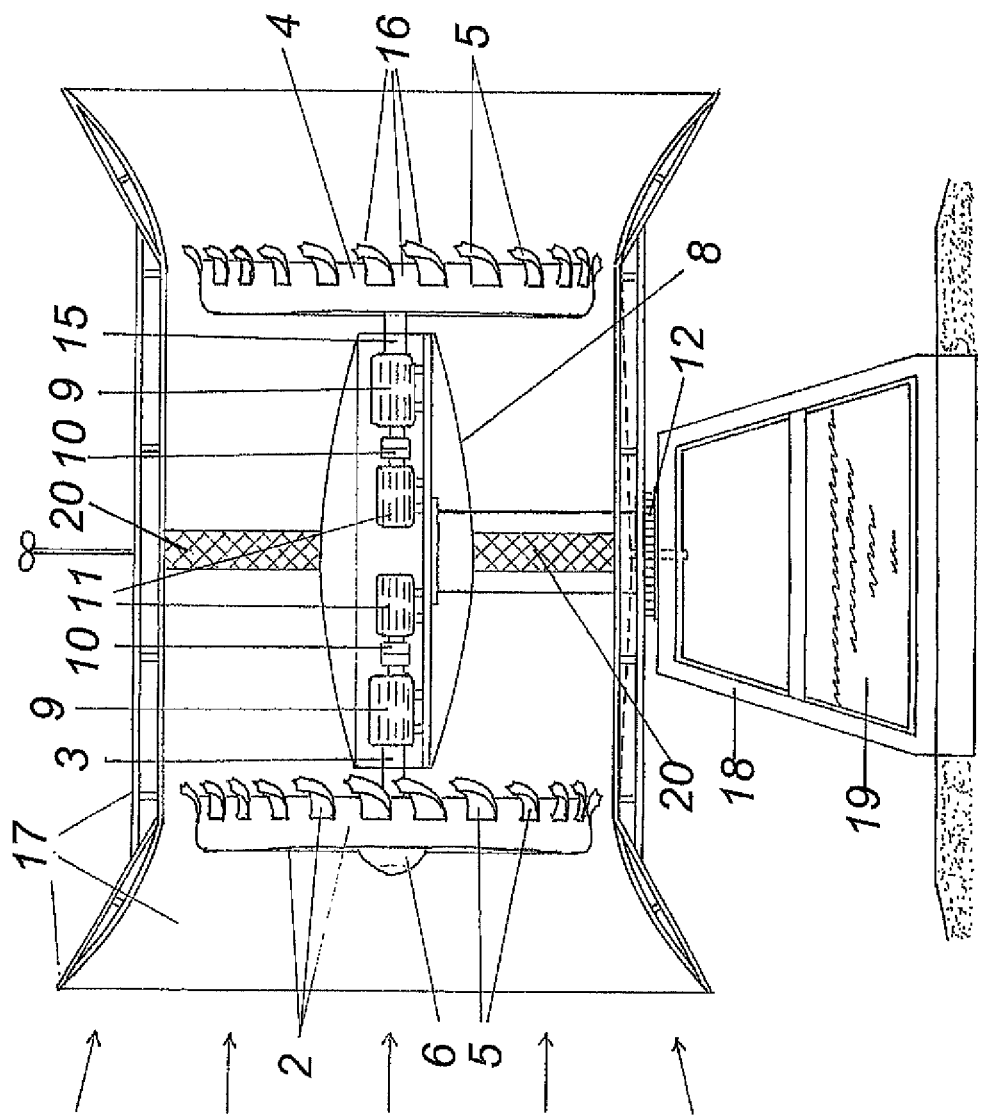
FIG. 3 is a cross-sectional side view of the configuration option of the wind power station which is the subject matter of this invention, with rotating vortex-generating wind concentrator and a downwind auxiliary concentrator on a parallel additional shaft with a horizontal, fixed laval-nozzle-shaped outer jacket and installed cooling wires and water collection basin.
Figure 6:
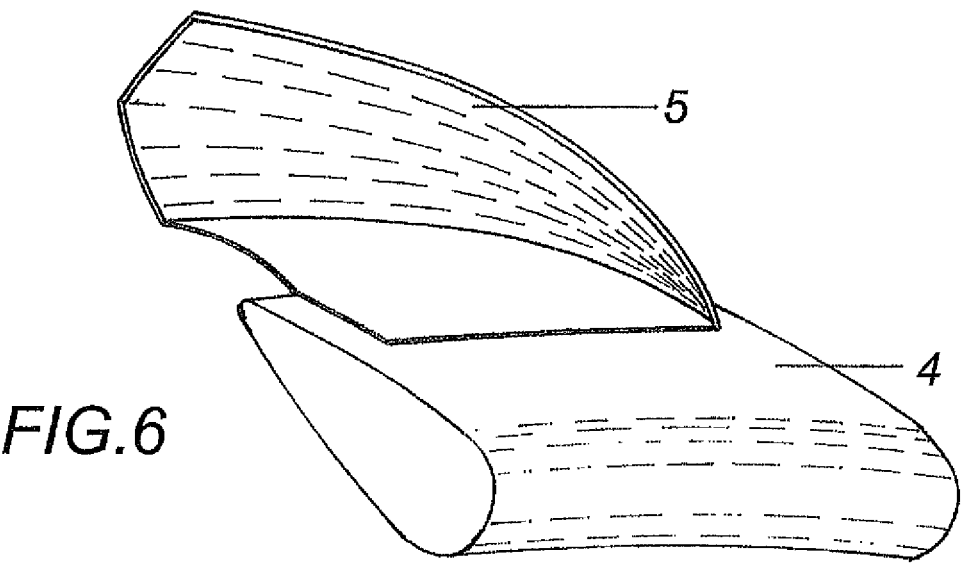
FIGS. 4 to 6 show a configuration option of the curved, inward turning sawtooth guide profiles arranged in a circle over 360 degrees in a counter-rotational direction in different views.
Figure 5:
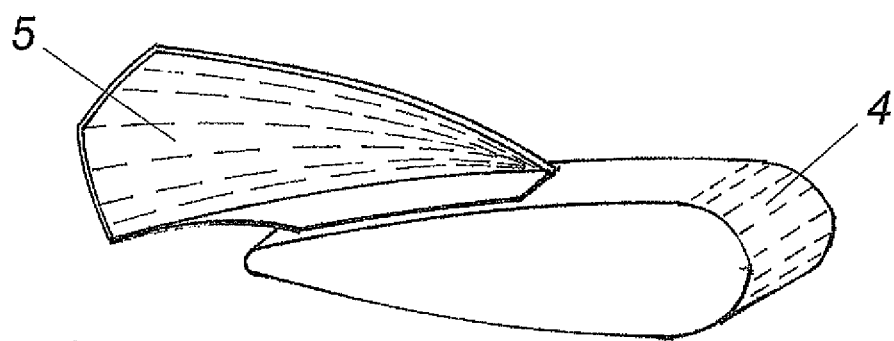
Figure 4:
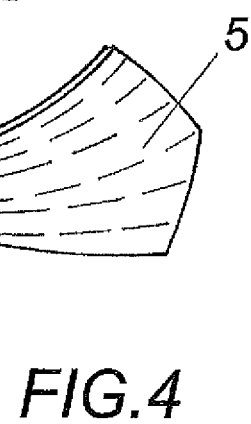
Figure 15:
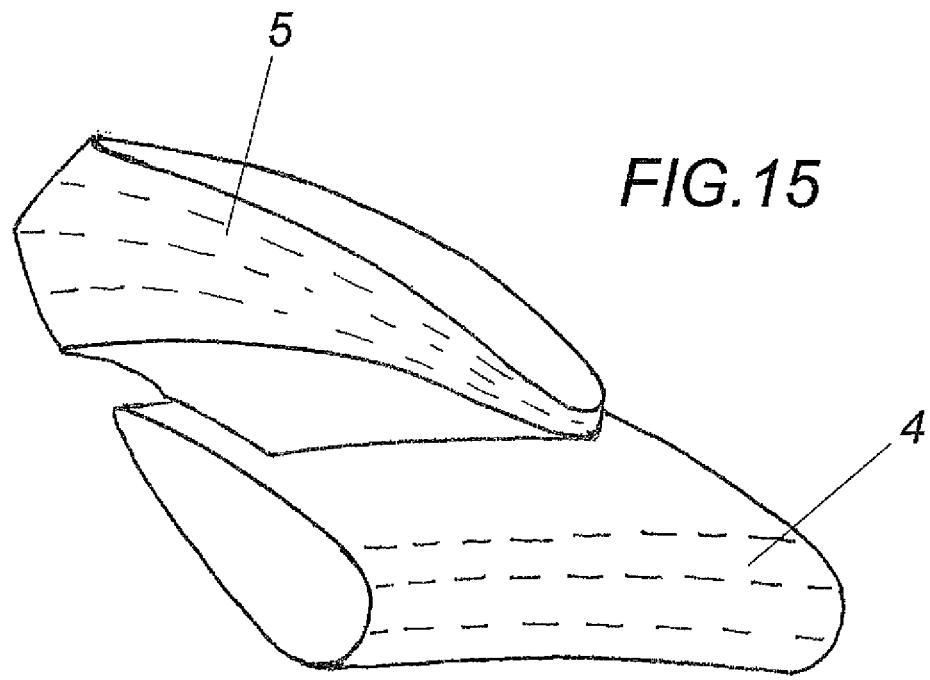
FIGS. 13 to 21 show design variants of configuration examples according to FIGS. 4-12 with guide profiles featuring a wing section.
Figure 14:
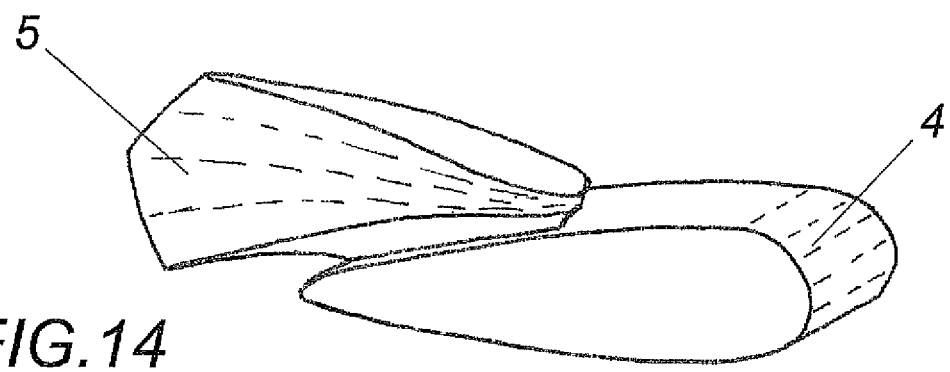
Figure 13:
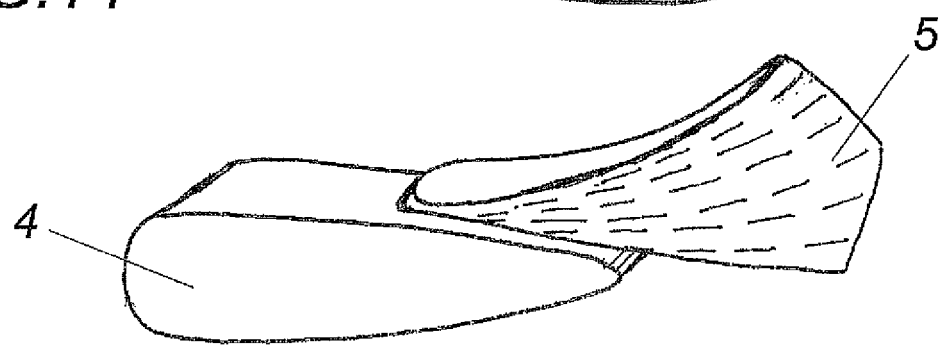
Figure 18:
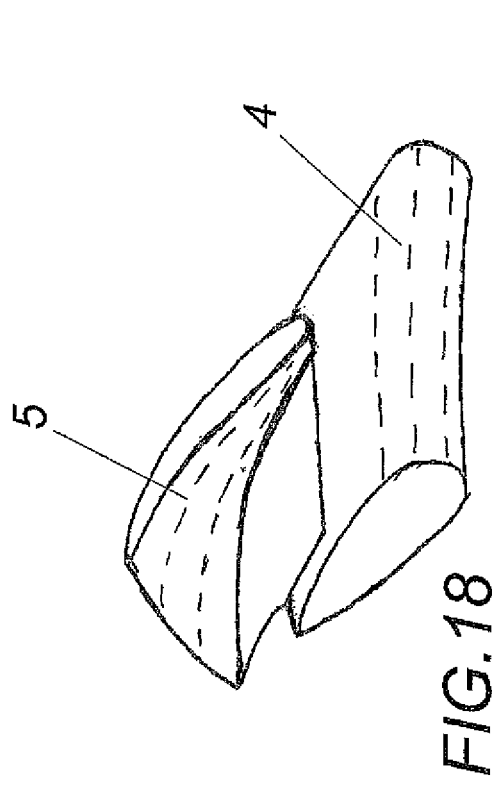
Figure 17:
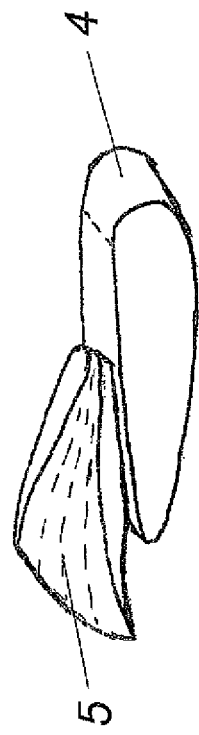
Figure 16:
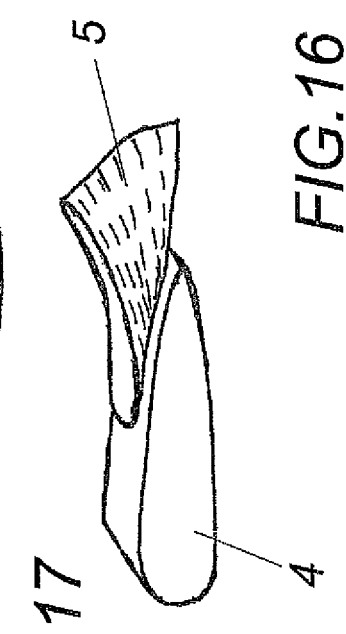
Figure 21:
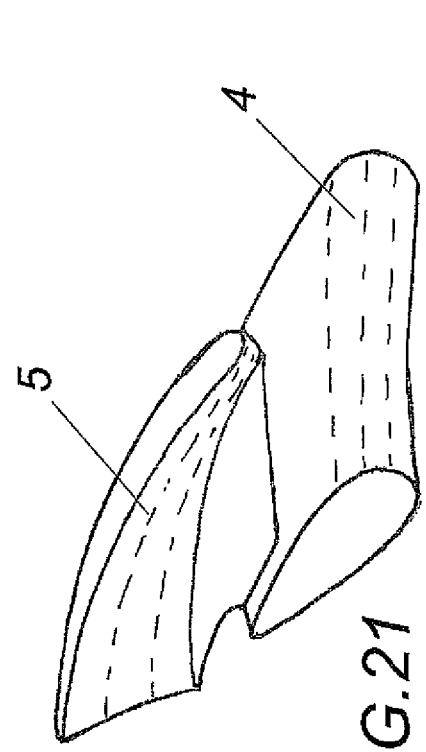
Figure 20:
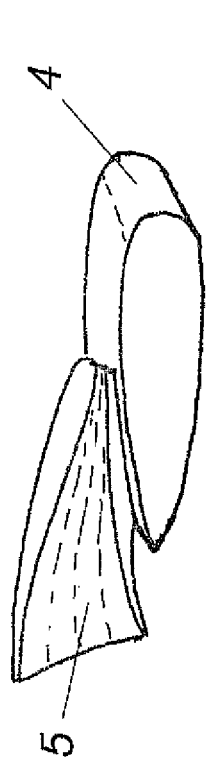
Figure 19:
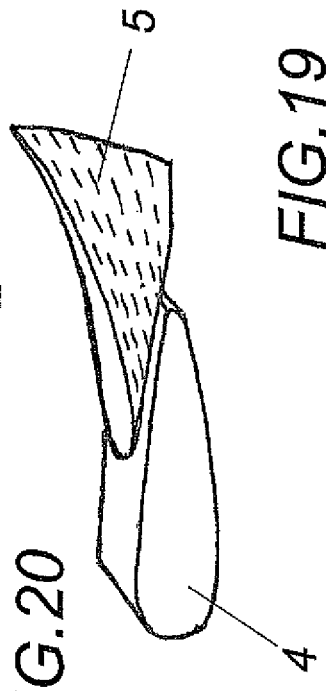

A wind power station 1 for energy generation with a rotating vortex-generating wind concentrator 2 mainly consists of an axial-flow, rotating wind concentrator 2 which is pivot-mounted on a shaft 3 with a ring-shaped outer jacket to be able to use the full cross-section of the incoming stream of air.

The outside of the ring-shaped outer jacket 4 features inward-turning, flow-concentrating, vortex-generating flow channels distributed over 360° with sawtooth-shaped guide profiles (5) curled in the rotational direction, and may widen (broaden the cross section) in the direction of the flow.

Between the hub 6 and the ring-shaped outer jacket 4, the wind concentrator 2 has concentrator blades 7 arranged in a circular, radial shape, which depending on the intended purpose of use feature either low-speed or high-speed profiles. Low-speed profiles in this context are defined as wing sections which are designed for low flow speeds. Accordingly, high-speed profiles are designed for higher or high flow speeds.

The vortex-generating guide profiles 5 are intended to force the incoming air to form edge vortices which, behind wind concentrator 2, merge to a vortex coil across the entire cross-section of the wind concentrator 2 through which the air flows. The circulation of air is boosted inside the vortex coil creating an increase in air speed and, hence a negative pressure. In the covered ring surface behind wind concentrator 2, i.e. in the concentrator eye, the local pressure is reduced across the entire cross-section of the ring-shaped outer jacket. Due to the vacuum in the core of the vortex, environmental air is fed in an upstream direction through the wind concentrator 2 as molecules flow at molecular speed in a local vacuum creating independent acceleration. This acceleration improves the roughness lengths with improved energy content of the airstream and balances short-term fluctuations of wind strength between gusts of wind.

As specified in the configuration examples (FIGS. 4 to 12), the vortex-generating, inward turning, curved guide profiles 5 at the tip of the profile may have a variety of shapes and, by using flexible materials, may also be implemented as operated against a spring force or designed to adjust to the airstream by using flexible materials.

Wind concentrator 2 is pivot-mounted on a shaft 3 sitting in a casing which is connected to a generator 11 through a gearbox 9 and coupling 10, converting wind energy to electrical energy. The air feed of the wind power station 1 is controlled by an electric motor 13 that interferes in the stewing ring. As shown in (FIGS. 1 and 2) the wind power station 1 which is the subject matter of this invention is mounted on a steel tube mast 14.

Coaxial to shaft 3, the wind concentrator 2 has a medium displacement element which at the same time serves as a hub 6 for connecting wind concentrator 2, channeling the airstream from the central turbine area where its effectiveness would be very small due to the short distance to the axis of rotation, to the farther outside part of the turbine, thereby additionally increasing the dynamic pressure in front of wind concentrator 2 and, as a consequence, the uplift force of the concentrator blades on the low-speed profiles.

In the configuration variant for solar use, the vertical wind concentrator 2 and the vortex-generating curved guide profiles 5 can be fitted with flexible, thin-layered solar panels for solar energy use. The solar power produced by the solar panels is dissipated and converted to electrical energy.

Wind concentrator 2 also provides the option to be used as a motor-operated propulsion-generating fan wind concentrator 2 by using generator 11, thereby creating a vacuum zone in an upstream direction by reducing the local pressure as a result of the suction effect in the downstream direction; the vacuum also propagates into adjacent local areas of the motor-operated fan wind concentrator thereby further increasing its effectiveness.

In another configuration variant of wind power station 1 which is the subject matter of this invention, wind concentrator 2 may be equipped with a downwind auxiliary wind concentrator 16 mounted on an additional shaft 15, which has an axial flow design such as wind concentrator 2 for a more efficient utilization of wind energy. The auxiliary wind concentrator 16 also operates a generator 11. Both wind concentrators, 2 and 16, are covered by a fixed ring- or diffuser-type outer jacket 17.

A laval-nozzle-shaped design on the incoming air side of outer jacket 17, which is tapered in the flow direction towards wind concentrator 2 and widens to a diffuser shape in a downstream direction towards the auxiliary concentrator 16, provides additional benefits.

The air feed of the wind power station 1 with wind concentrators 2 and 16 aligned parallel to each other, is controlled by an electric motor 13 that interferes in the slewing ring 12. As shown in (FIG. 3), the wind power station which is the subject matter of this invention is mounted on a lattice mast 18.

For a configuration variant for solar use, the ring-, diffuser- and laval-nozzle-shaped outer jacket 17 of the vertically arranged in-line wind concentrators 2 and 16 of wind power station 1 which is the subject of this invention, may be equipped with flexible, thin-layered solar panels for solar energy use. The heat energy produced by the solar panels is released and converted to electrical energy.

Another configuration variant of power station 1 which is the subject matter of this invention according to FIG. 3 provides for the withdrawal of water from the humidity of the air from the airstream to the ring-, diffuser- or laval-nozzle-shaped outer jacket 17. The airstream to the ring-, diffuser- or laval-nozzle-shaped outer jacket is cooled down between wind concentrator 2 and the auxiliary wind concentrator 16 which results in the elimination of water. The water eliminated from the airstream may be collected in a water basin 19 and used for commercial purposes.

For another configuration variant for cooling the air even more to withdraw water from the humidity of the air, it is suggested to equip wind concentrator 2 in an upstream direction and/or the ring-, diffuser- or laval-nozzle-shaped outer jacket 17 with integrated cooling wires 20 or cooling loops which can also be arranged parallel in a grid-shape configuration between in-line wind concentrator 2 and auxiliary concentrator 16.

Wind power station 1 according to FIG. 3 which is he subject matter of this invention, can also be motor-operated by wind concentrator 2 or auxiliary concentrator 16 via its generator 11 providing the option of eliminating water from the air also in times of no or little wind. In this configuration variant, either wind concentrator 2 or auxiliary concentrator 16 are operated as a fan concentrator 2 or 16 with a propulsion-generating effect.

The guide profiles according to FIGS. 4-12 feature a wing section to improve uplift force (rotary drive) and vortex shedding during low wind speeds.

The invention claimed is:
1. A wind power station for energy generation comprising
an axial-flow, rotating, vortex-generating wind concentrator pivot-mounted on a shaft, covered by a ring-shaped outer jacket, an outside of the ring-shaped outer jacket comprising guide devices distributed over 360°, the axial-flow, rotating, vortex-generating wind concentrator being equipped with concentrator blades in a circular arrangement between the shaft and the ring-shaped outer jacket,
an axial-flow auxiliary wind concentrator downstream from the axial-flow, rotating, vortex-generating wind concentrator and fitted on an additional shaft, and
a fixed, horizontally fitted ring-, diffuser- or laval-nozzle-shaped outer jacket surrounding both the axial-flow, rotating, vortex-generating wind concentrator and the axial-flow auxiliary wind concentrator,
wherein the guide devices comprise edge-vortex-generating, curved sawtooth guide profiles producing a down-stream vortex coil across the entire cross-section of the ring-shaped outer jacket, and
wherein the axial-flow, rotating, vortex-generating wind concentrator includes cooling wires, the cooling wires running like a grid between the axial-flow, rotating, vortex-generating wind concentrator and the auxiliary wind concentrator, the cooling wires cooling down the respective surfaces and thereby providing increased cooling of the axial air stream.

2. The wind power station according to claim 1, wherein the guide profiles are curved in the longitudinal direction of the profile and, as appropriate, around a longitudinal profile axle.

3. The wind power station according to claim 1, wherein the guide profiles are equipped with wing-tip shaped winglets.

4. The wind power station according to claim 3, wherein the outer jacket, the guide profiles and the winglets have a wing profile, as appropriate.

5. The wind power station according to claim 1, wherein the axial-flow, rotating, vortex-generating wind concentrator has an upwind or downwind design.

6. The wind power station according to claim 1, further comprising flexible, thin-layered solar panels:
   coating the axial-flow, rotating, vortex-generating wind concentrator,
   cooling down the surfaces of the axial-flow, rotating, vortex-generating wind concentrator by way of heat dissipation, and
   cooling the axial air stream flowing through the axial-flow, rotating, vortex-generating wind concentrator.

7. The wind power station according to claim 1, further comprising a generator,
   wherein the axial-flow, rotating, vortex-generating wind concentrator is motor-operated as a propulsion-generating wind concentrator with a fan via the generator.

8. The wind power station according to claim 1, comprising a dedicated break device for the axial-flow, rotating, vortex-generating wind concentrator.

9. The wind power station according to claim 1, further comprising flexible, thin-layered solar panels coating the fixed, ring-, diffuser- or laval-nozzle-shaped outer jacket for cooling down the surfaces of the fixed ring-, diffuser- or laval-nozzle-shaped outer jacket and the axial air stream by heat dissipation.

10. The wind power station according to claim 1, comprising a design by which the amount of water contained in the humidity of the air which is eliminated in the process of cooling down of the air stream, is drained at the bottom of the fixed ring-, diffuser- or laval-nozzle-shaped outer jacket.

11. The wind power station according to claim 10, comprising a water basin configured to collect the water drained at the bottom of the fixed ring-, diffuser- or laval-nozzle-shaped outer jacket.

12. The wind power station according to claim 1, with the option to motor-operate the axial-flow, rotating, vortex-generating wind concentrator or the auxiliary concentrator via the generator as a propulsion-generating wind concentrator with a fan which makes it possible to also use the system for eliminating water from the air stream during still air and light wind conditions and thereby use it as a dehumidifier.

13. The wind power station according to claim 1, comprising a dedicated break device for the auxiliary concentrator.

14. The wind power station according to claim 1, wherein the axial-flow, rotating, vortex-generating wind concentrator includes cooling loops, the cooling loops running like a grid between the axial-flow, rotating, vortex-generating wind concentrator and the auxiliary wind concentrator, the cooling loops cooling down the respective surfaces and thereby providing increased cooling of the axial air stream.

* * * * *